United States Patent [19]

Fallas

[11] Patent Number: 4,583,351
[45] Date of Patent: Apr. 22, 1986

[54] AUTOMATIC CASE PACKING APPARATUS

[76] Inventor: David M. Fallas, 7000 Imperial Dr., Waco, Tex. 76710

[21] Appl. No.: 591,732

[22] Filed: Mar. 21, 1984

[51] Int. Cl.$^4$ .......................... B65B 35/44; B65B 57/20
[52] U.S. Cl. .......................................... 53/501; 53/244; 53/534; 53/542
[58] Field of Search ............... 53/244, 247, 248, 249, 53/250, 252, 501, 534, 537, 542, 544

[56] References Cited

U.S. PATENT DOCUMENTS

| | | | |
|---|---|---|---|
| 2,941,676 | 6/1960 | Harker | 214/7 |
| 3,389,906 | 6/1968 | Walton | 271/70 |
| 3,445,980 | 5/1969 | Salomon . | |
| 3,590,972 | 7/1971 | Mosterd | 198/20 |
| 3,673,756 | 7/1972 | Prete et al. | 53/248 |
| 3,729,085 | 4/1973 | Schlueter | 198/25 |
| 3,778,965 | 12/1973 | O'Lenick et al. | 53/248 |
| 3,783,584 | 1/1974 | Rauser | 53/248 |
| 3,914,919 | 10/1975 | Boissy et al. | 53/542 |
| 4,356,906 | 11/1982 | Fallas | 198/413 |
| 4,398,383 | 8/1983 | Prakken | 53/247 |

OTHER PUBLICATIONS

Brochure from Sabel Engineering Corporation on a case packer.
Advertisement for a Salwasser (brand) case loading machine.
Brochure for Lightning (brand) case packers.

*Primary Examiner*—James F. Coan
*Attorney, Agent, or Firm*—Arnold, White & Durkee

[57] ABSTRACT

An apparatus for automatically collecting and packing a selected number of units of vertically oriented breakable product into a carton is disclosed. The apparatus includes a frame and a collecting assembly mounted to the frame. The collecting assembly includes collecting support apparatus for indexing forward, counting and collecting a row of units of products in a vertical orientation until a selected number of such units of products is collected. The apparatus of the present invention also includes a feed station operatively aligned with the collecting support apparatus such that the feed station receives a row of collected product from the collecting support apparatus.

5 Claims, 7 Drawing Figures

Fig. 1

AUTOMATIC CASE PACKING APPARATUS

BACKGROUND OF THE INVENTION

The invention relates generally to devices for handling flexible bagged products such as potato chips and, more particularly, it concerns an improved apparatus for automatically packing flexible bagged products such as potato chips into a carton or case for handling.

The efficient handling of bags of breakable product such as potato chips or corn chips has long been a problem to the makers of such product. To assist such handling, there has been developed a collating unit for bagged products and the like which is the subject of my U.S. Pat. No. 4,356,906. This patent is incorporated herein by reference for the purpose of setting forth a suitable apparatus for supplying collated product in units in a vertical orientation.

While the provision of a machine which can collate and collect flexible bagged products in a vertical orientation is believed to be a significant development in the handling of such product, there still exists the need to move the product from the place of vertical collation into packing cases. At the same time, the movement of the bags into the cases must be accomplished without harm to the contents of the bags. At present, such packing of the bags into cases is believed to be done manually by physically picking up the bags from a collecting platform and inserting the bags into a case.

It is therefore desirable to provide an apparatus which automatically collects and loads flexible bagged products into cartons. Because the cartons for such products will often have room for more than one row of product, such an apparatus should, preferably, also be capable of sequentially collecting a plurality of units or product in a row for the loading of sequential rows of product into a carton.

SUMMARY OF THE INVENTION

The present invention provides such an apparatus for automatically collecting and packing a selected number of units of vertically oriented product into a carton. The apparatus is particularly adapted for use in situations wherein units of product are supplied to the apparatus in a vertical orientation, one at a time. While the apparatus is particularly adapted for use with flexible bagged products, it will be appreciated that the apparatus may also be utilized with units of vertically oriented product packaged in other containers.

More specifically, the apparatus for automatically collecting and packing a selected number of units of vertically oriented product into a carton includes a frame and a collecting assembly mounted to the frame. The collecting assembly includes a collecting support means for indexing forward, counting, and collecting such units of product as they are received in a vertical orientation until a selected number of units of such product is collected. The collecting assembly further includes an actuation means for sensing when the selected number of units are collected and for advancing such a selected number of units of product as a row, once collected.

The apparatus further includes a feed station operatively aligned with the collecting support means such that the feed station receives the row of collected product from the collecting support means upon advancement by the sensing and advancing means. The feed station includes a door pivotally mounted to the frame to pivot between a vertical open and a horizontal closed position. The feed station further includes a packing sensing and actuation means for sensing the positioning of the row of product over the pivoting door and for selectively pivoting the door between the horizontal closed position prior to and during the positioning of the row of product thereon, and the vertical open position whereby the product is allowed to drop through the open doorway by gravity.

In a preferred embodiment of the present invention, the apparatus further includes a means for selectively positioning a carton under the feed station door to receive a row of product therein upon the opening of the door. In a preferred aspect of this embodiment, the apparatus further includes a means for sequentially indexing a first carton a selected distance in order to accommodate the loading of subsequent rows of product into the first carton and for indexing a second carton into place once the first carton is filled.

In a more preferred embodiment of the present invention, the apparatus also includes a plunger operatively associated with the frame such that the plunger is movably disposed over the door for vertical movement downwardly toward the door. The apparatus further includes a means operatively associated with the packing sensing and actuation means for moving the plunger downwardly toward the door upon the movement of a row of product into position. The plunger may thereby utilized to assist the loading product through the doorway into the carton.

In the most preferred embodiment of the present invention, the apparatus further includes a product supply apparatus for supplying the product in a vertical orientation to the collecting assembly. In the most preferred aspect of this embodiment, the product supply assembly comprises a collating unit for bagged products such as is disclosed in U.S. Pat. No. 4,356,906 (incorporated by reference).

Accordingly, the present invention provides an apparatus for automatically collecting and packing a selected number of units of vertically oriented product into the carton. The apparatus provides a means of indexing product forward to prevent damage to the product while the product is being collected into a row. The apparatus further provides a means for sequentially loading a plurality of rows of product into a selectively positioned carton.

BRIEF DESCRIPTION OF THE DRAWINGS

This invention will further be illustrated by reference to the appended drawings which illustrate a particular embodiment of the device for automatically collecting and packing a selected number of units of vertically oriented product into a carton in accordance with this invention.

DESCRIPTION OF THE PREFERRED EMBODIMENT

It will be understood that the present invention can be implemented in a number of different ways, within the scope of the claims appended hereto. The presently preferred embodiment of the invention, will now be descr.ibed.

Figure 1:
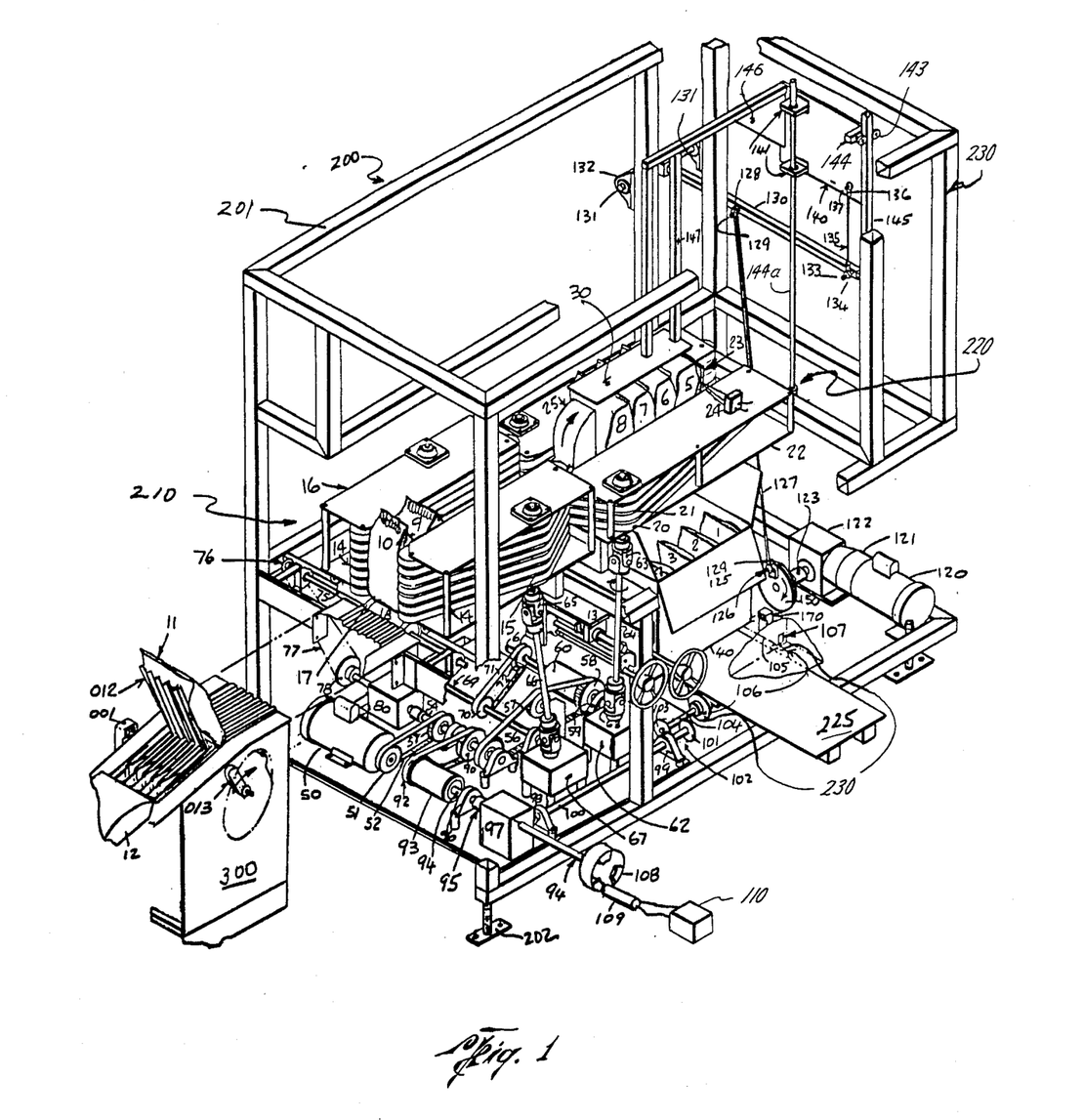
FIG. 1 is an isometric view of the present invention having selected structural members cut away to accommodate illustration of pertinent features.
Figure 2:
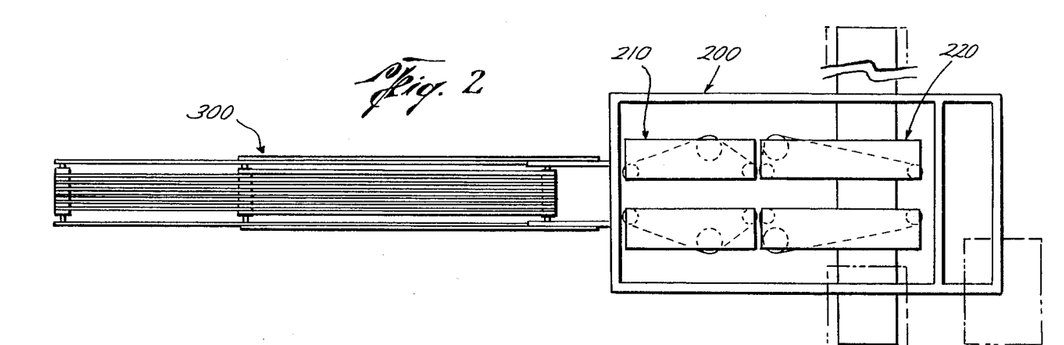
FIG. 2 is a plan schematic view of the device illustrated in FIG. 1.
Figures 3, 4:
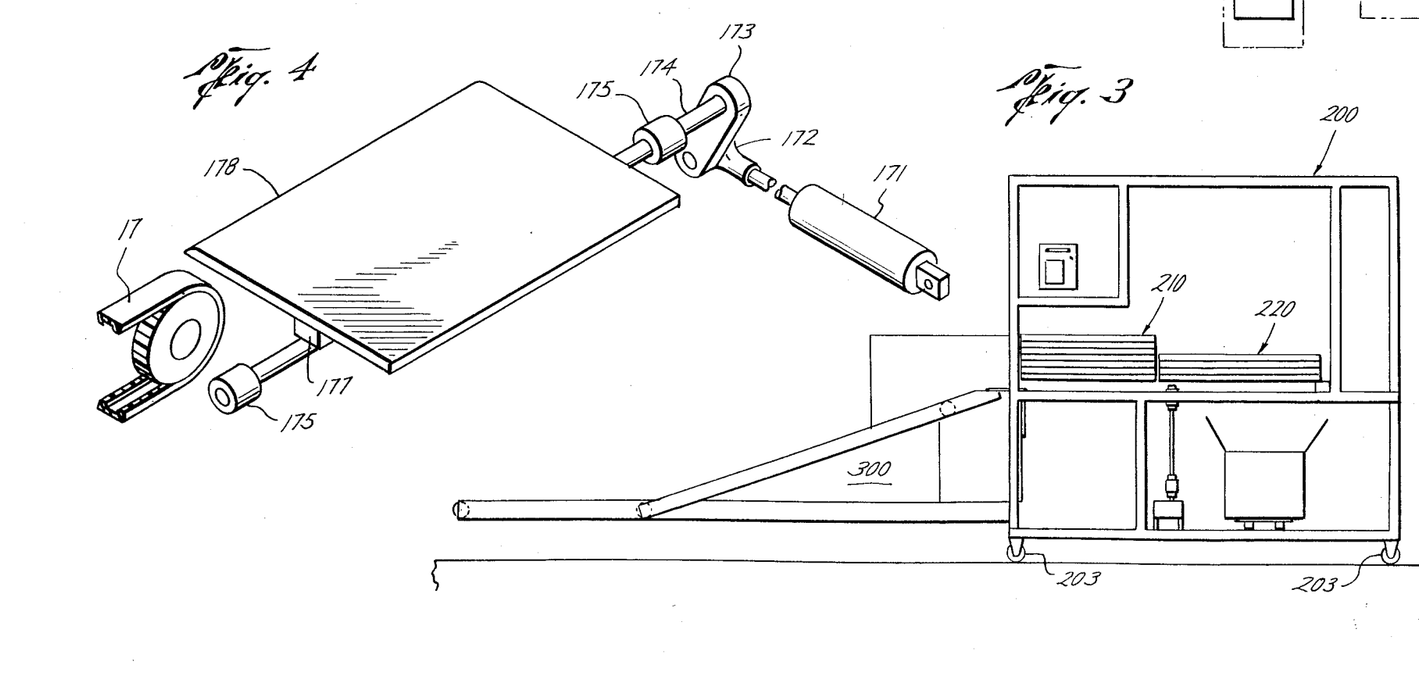
FIG. 3 is a side schematic view of the device illustrated in FIG. 1.
FIG. 4 is a isometric view of the pivoting door assembly, illustrating the driving mechanism for the pivoting door assembly in accordance with the present invention.

Referring now to FIGS. 1, 2 and 3 the present invention is generally represented by a frame 200 which is adapted to support a collecting assembly 210 and a feed station 220. The frame 200 may be comprised of a plurality of suitable structural support members 201 arranged in a configuration suitable to provide structural support for the collecting assembly 210 and the feed station 220. In the preferred embodiment, the frame is comprised of tubular steel members having a rectangular shape in cross section. It will be appreciated, however, that the shape of the particular structural members 201 and the overall configuration of the frame 200 are not critical so long as the frame provides the desired structural support.

The frame 200 may be adapted to be fixed in position by base plates 202 such as shown in FIG. 1, which include adjustable legs for leveling the frame 200. Alternatively, the frame 200 may be adapted to be movable on wheels 203 such as is shown in FIG. 3.

Referring now to FIG. 1, a series of bagged product units 1, 2, 3, 4, 5, 6, 7, 8, 9, 10, 11 and 12 is shown. These bags may contain breakable products, such as potato chips. As seen in FIG. 1, the incoming bags are supplied to the collecting assembly 210 by a stacking mechanism 300 which supplies the bags in a vertical orientation using pusher arms 012 and a crank mechanism 013. In the preferred embodiment, this stacking mechanism is constructed in accordance with the collating unit described in my U.S. Pat. No. 4,356,906.

The collecting assembly 210 includes a sensing means 001 for detecting the arrival of a bag (in FIG. 1, bag 11) to the collecting assembly 210. The sensing means 001 generates an electric signal which is sent to a logic controller where the signal is used to effect two functions. First, the electric signal causes the collecting assembly 210 to index the units of product (bags 9 and 10 in FIG. 1) forward a distance equal to the approximate thickness of a bag or unit of product upon the arrival of a new bag 11. Secondly, each electric signal is counted and used to determine when a preselected number of units of product are in the collecting assembly 210, at which time the units or product are advanced as a row to the feed station 220.

The electric signal generated by the detection mechanism 001 is communicated to a suitable controller capable of counting the number of electric signals and generating signals to effect the indexing forward of the product and the advancing of the product once a row is completed. In the preferred embodiment, a single microprocessor programmable controller unit (not shown) such as the SY/MAX (brand) Model 300 controller having standard SY/MAX Input/Output units is used to receive and process the electrical signals from the detection mechanism 001 and the detection mechanisms 24, 109, and 170 which will be described in greater detail below. It will be appreciated, however, that other controlling units may be utilized in accordance with the present invention.

Additionally, while the desired method and functions of the present invention will be set forth above and below, it is believed that the particular hard wiring and programming of a suitable commercially available controller may be accomplished in a number of ways, depending upon the particular controller, and will be known to those of skill in the art in view of the disclosure herein of desired functions.

Referring again to FIG. 1, in the preferred embodiment, the detecting mechanism 001 is mounted to the stacking mechanism 300 and is comprised of instrumentation for generating an optical beam just above the stacking mechanism 300 and a photoelectric detection mechanism of conventional design to detect the arrival of the bag. An electrical signal is generated by the detecting mechanism 001 to denote the presence of the bag 11 at the incoming or receiving location on the collecting assembly 210. Alternatively, the detecting mechanism 001 could be mounted to the collecting assembly 210 immediately before the belt 14. Also, the detection mechanism 001 could be mechanically actuated, by a weight-sensitive switch or the like.

The collecting mechanism 210 further includes advancing means for selectively indexing forward units of product (e.g. bags 9 and 10) upon the arrival of additional units of product (i.e. bag 11) and for transporting the units of product to the feed station 220 once a row is completed. Referring to FIG. 1, in the preferred embodiment, the advancing means includes opposing sets of side belts 14 comprised of a material having high surface friction such as urethane. The belts 14 are driven by rollers 15, all of which are housed in housing frame 16. The housing frames 16 are adjustable mounted to the frame 200 such that the frame 16 can be adjusted for various bag widths by a screw adjustment 13. The advancing means further includes a horizontal belt 17 which is driven by a roller 18 by means described in greater detail below.

The electric signal generated by the detection mechanism 001 is used to actuate the movement of belts 14 and 17 to index forward with every bag. The speed of belts 14 and 17 is synchronized with the pusher petals 012 so that no product damage occurs. The number of bags passing the detection mechanism 001 is electronically counted such that when a predetermined count of units of product is reached, belts 14 and 17 are actuated to assume a constant velocity to advance the product units or bags to the feed station 220.

Figures 5, 6, 7:
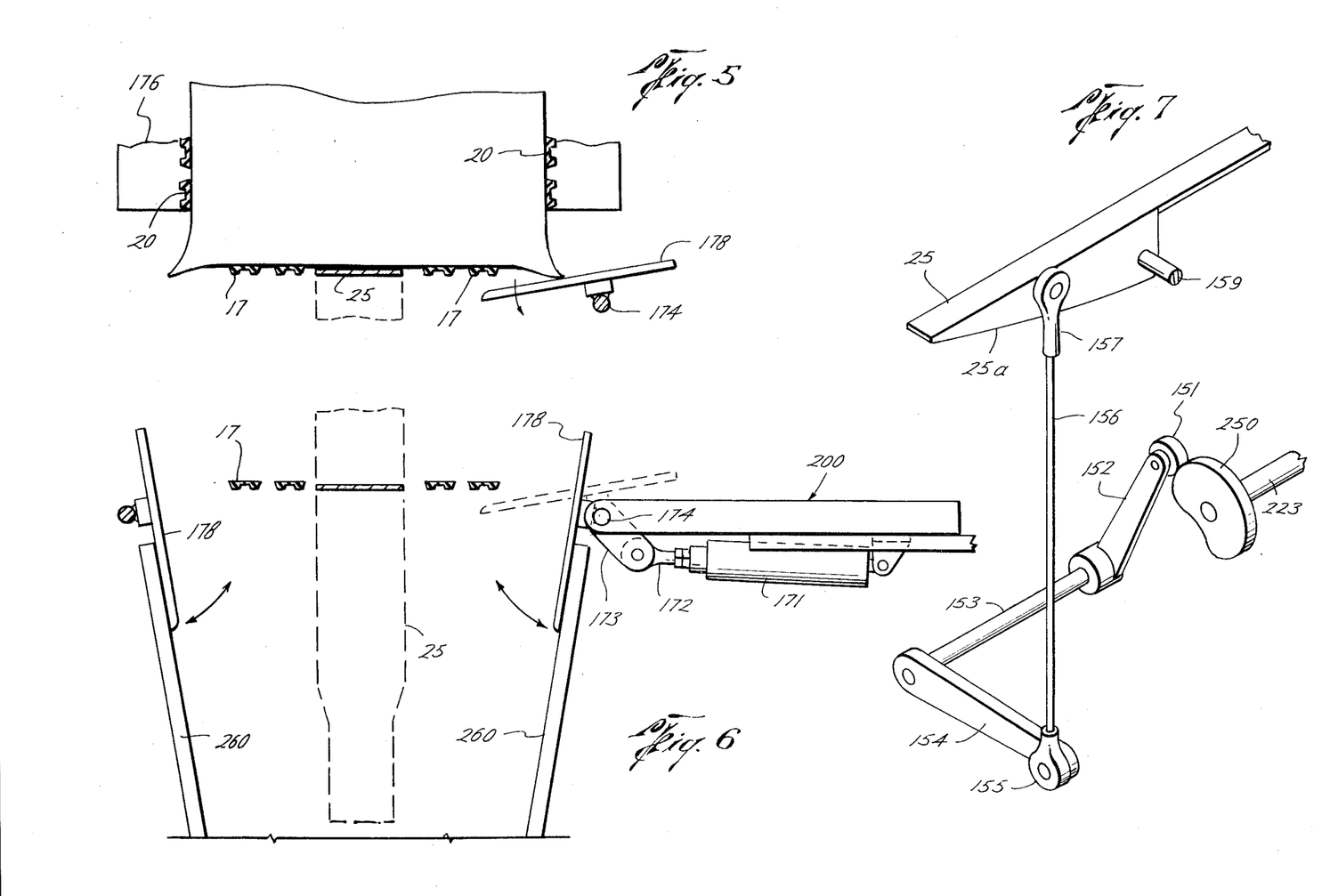
FIG. 5 is a schematic cut away view further illustrating the positioning of the pivoting door of the present invention in relation to the horizontal belt of the collecting system.
FIG. 6 is a partial sectional view similar to FIG. 5, further illustrating the operation of the pivoting door and the position of an optional drop chute.
FIG. 7 is a isometric, schematic view illustrating the drive mechanism for the pivoting plate of the present invention.

The feed station 220 includes a door for selectively loading a row of product into a carton disposed below the door (not shown in FIG. 1, but shown in position relative to the belts 20 and 17 in FIGS. 4–6). The door is pivotally mounted to the frame 200 to pivot between a vertical open position and a horizontal closed position, as best shown in FIG. 6, whereby the pivoting door provides a base in the horizontal closed position to receive a row of product during its transportation to the feed station 220 from the collecting assembly 210 and whereby the pivoting door may be pivoted to open to allow the row of product to pass by gravity to a carton disposed beneath the door.

In the preferred embodiment, the door includes a pair of opposing trap doors 178 and a pivoting plate 25 as shown in FIGS. 1, 4, 5, 6 and 7. The operation of the doors 178 and the plate 25 will be described in greater detail below. It is believed, however, that a single door 178 may be utilized, given suitable alignment means for the product between the feed station 220 and a carton disposed therebelow.

The feed station 220 further includes a means for transporting a row of product to a position over the doors 178. In the preferred embodiment, the feed station 220 comprises a second set of opposing side belts 20 which are mounted to the frame in a housing 22 in a manner similar to the opposing side belts 14 such that the side belts 20 may be adjusted for various bag sizes. The side belts 20 are operatively aligned with the side belts 14 such that the feed station 220 receives the predetermined number of collected products upon their advancement by the belts 14 and 17. The side belts 20 are driven by pulleys 21 at the same speed as the side belts 14. The speed of each of the belts 14, 17 and 20 should be such that the product clears the belts 14 of the collecting assembly 210 before a new unit of product arrives to the collecting assembly 210.

In the preferred embodiment, the housing 22 is further movably mounted to the frame 200 such that upon the pivoting of the doors 178 to open, the belts 20 and housing 22 may be retracted slightly (each by approximately one-half inch in the preferred embodiment) to faciliate the passage of a row of product downward past the belts 20 into a carton 40. The selective retraction of the housing 22 and belts 20 may be provided by a number of suitable devices such as pneumatic or hydraulic cylinders (not shown). Additionally, the actuation of the movement of the belts 20 and housing 22 is triggered by an electric signal generated by the detection mechanism 24 sent to the programmable controller as will be described in greater detail below.

The feed station further includes an indexing means for positioning the row of product onto the pivoting doors 178. In the preferred embodiment, the belts 20 carry the row of product over the doors 178 or dropping zone and up to a back stop 23. The leading edge of the first bag in the row (bag 5 in FIG. 1) is detected by a photoelectric detection mechanism 24 which generates an electric signal which is sent to the programmable controller. The electric signal generated by the detection mechanism 24 is used to cause belts 14, 17 and 20 to stop driving. The electric signal of the detection mechanism 24 is also utilized to actuate the pivoting of the door 178 from the horizontal closed position to the vertical open position to allow the passage of product by gravity through the door 178. At the same time the signal causes belts 20 and housing 22 to retract as described above. The row of bags 5 through 8 are then deposited into the carton next to the bags 1 through 4 shown in FIG. 1.

At the same time that the bags 5–8 are being gravity fed into the carton, a third row of product (bags 9 through 12) is being stacked inside belts 14 to repeat the process.

In this way, a multitude of rows may be stacked in a case, depending on the case configuration desired. When the case is filled, a new case may be placed into position and the filled case may be ejected. The cycle may then be repeated.

Referring now to FIG. 1, the belts 14, 17 and 20 each include a means for driving the belts. It will be appreciated that the drive systems should have the capacity to be synchronized to perform the functions set forth above. In the preferred embodiment, synchronization is enhanced by the use of a single drive motor 50 which is adapted to drive all of the belts.

In particular, the drive motor 50 rotates a layshaft 54 by means of a drive pulley 51, a belt 52 and a driven pulley 53. The layshaft 54 drives a clutch-brake 60 by means of pulley 56, belt 57 and clutch-brake input pulley 58. When the clutch engages and the brake releases the clutch-brake output shaft 61, which is located by bearings 59, rotates and drives two worm reducers 62 by flexible couplings. The vertical output of the reducer 62 drives the second set of belts 20 by means of a pulley 21, universal joint 63 and shaft 64.

The first set of belts 14 is driven by pulley 15, universal joint 65, shaft 66 and two reductors 67. The two reductors 67 are, in turn, driven by a flex coupling, a shaft 69, a pulley 70, a belt 71, and a pulley 72 which is attached to the output shaft 61. Accordingly, both the belts 14 and the belts 20 are indirectly driven by the layshaft 54.

Referring stil to FIG. 1, the horizontal belts 17 are driven by the layshaft 54 by means of a pulley 18, shaft 75, sprocket 76, chain 77, sprocket 78, and in-line reductor 80.

In FIG. 1, the particular drive mechanism for one side of the belts 14 and 20 is illustrated. It should be appreciated that corresponding drive mechanisms are included for the opposing sides of the belts 14 and 20.

The automatic packing mechanism of the present invention may also include a means for selectively positioning a carton under the feed station pivoting doors 178 to receive a row of product. In the preferred embodiment, the carton positioning means includes an elongated platform 225 mounted to the frame 200 such that the platform 225 extends beneath the pivoting trap door 178. The platform 225 has a width less than the anticipated width of a carton for receiving product. The carton positioning means further includes a pair of opposing chain drive mechahisms 230 mounted along either side of the platform 225. The chain drive mechanisms includes a pair of opposing drive sprockets 106 and a pair of driven sprockets 106a (not shown) at each end upon which are mounted chains 105. A plurality of pusher lugs 107 are selectively attached to each chain 105 in a spaced relationship and are configured such that the lugs 107 extend above the platform 225 to engage with a carton resting upon the platform 225. The sprockets 106 are mounted to a shaft 104 which also includes a sprocket 103 disposed thereon. In the preferred embodiment, the shaft 104 is driven by shaft 100 via sprocket 103, chain 102, and sprocket 103. In turn, the shaft 100 is connected to the output of a worm reductor 97. The worm reductor 97 is connected to an output shaft 94 and a clutch-brake 93. The output shaft 94 and the clutch-brake 93 are driven by layshaft 54 by means of timing pulley 90, belt 91 and input pulley 92.

Accordingly, when the case index drive of the present invention is utilized, the pusher lug 107 pushes a case 40 until the leading edge of the case 40 is seen by a detection member 170 positioned along the platform 225. The detection member 170, which may be a photoelectrical device similar to those described above, generates an electric signal which is used to stop the driving of the chain 105. The case 40 is now positioned to accept a first row of product.

In the preferred embodiment, the carton positioning means is further adapted to index the carton for consecutive rows of product. More particularly, when the detection device 24 detects the leading edge of the first row of bags, and these are dropped into the carton, the carton is then indexed forward approximately one bag width. The indexing of the case forward of a distance of approximately one bag width is accomplished by means of a proximity switch 109 and counter 110 which is adapted to read a selected number of counts of the revolutions of the output shaft 94. The output of the counter 110 is fed into the programmable controller, which is programmed to read the signal generated by the counter 110 and generate an output signal to an actuating mechanism operatively connected with the chain 105 to move the chain 105 to index the carton 40 forward to a selected width for a selected number of rows of bags. For example, the controller may be set to index the carton forward a selected distance three times for three rows of bags. Once the third row of bags is deposited into the carton, the computer signals the chain 105 to continue driving until the leading edge of a new case is seen by the detection device 170.

The automatic packing apparatus of the present invention may also include a plunger operatively associated with the frame for assisting the loading of product into a carton. Referring now to FIG. 1, in the preferred embodiment, the plunger 30 is mounted to a frame 230 operatively associated with the frame 200 such that the plunger 30 is positioned over the doors 178 and is adapted for movement downwardly toward the doors 178. The plunger 30 further includes a means, operatively communicating with the detection device 24, for moving the plunger downwardly toward the door upon the pivoting of the door to the open position. In particular, in the preferred embodiment, the electrical signal generated by the detection mechanism 24 is utilized to actuate the downward movement of the plunger simultaneously with the opening of the pivoting door 178.

The plunger may be mounted to the frame 230 and adapted to be driven downwardly in a number of ways suitable to provide the desired direction of motion and the desired distance of motion. In the preferred embodiment, the plunger 30 is attached to a plate 140 by light weight structural members 146 and 147. The plate 140 is constrained to move vertically by linear bearings 141 sliding on a vertical shaft 144a. The plate 140 is located by ball bearings 143 attached to plate 140 by block 144. The ball bearings slide against a motion frame 145. As can be best seen in FIG. 1, the movement of the plunger 30 is adapted to correspond directly to the vertical linear motion of the movement of the plate 140. In turn, in the preferred embodiment, the plate 140 is linearly displaced to provide the desired movement of the plunger 30.

Referring still to FIG. 1, there is shown, a means for linearly displacing the plate 140 in order to provide movement of the plunger 30. In particular, a motor 120 is provided which drives a clutch-brake 121 and a gear reductor 122. The output of the gear reductor 122 drives a cam shaft 123. A crank 126 connected to a cam 150 drives a connecting rod 127 by means of a bearing 124 and housing 125. The connecting rod 127 oscillates an arm 130 by means of a rod end 128 and a pin 129. The rod 130 oscillates about the shaft 131 which is retained by bearings 132 and mounted to the frame 230 as shown in FIG. 1. The outer end of the arm 130 moves plate 140 vertically by means of pin 133, rod end 134, connecting rod 135, rod end 136 and pin 137.

Accordingly, when the plunger 30 of the present invention is utilized, the detection device 24 senses the presence of the leading edge of the bag 5 and generates an electric signal to start the operation of the loading of the bags into the carton. The electric signal from the detection device 24 is fed into the programmable controller (not shown) which sends a signal to activate the pivoting of the doors 178 to the open position and the movement of the plunger 30, as connected indirectly to motor 120, downwardly to assist the movement of the bags 5 through 8 through the doors 178 into the carton 40.

It has been found that because of the flexible nature of the bagged product for which the present invention is especially designed, it is sometimes desirable to provide a pivoting plate 25 behind the rear most bag (bag 8 in FIG. 1) to maintain the upright, vertical orientation of the bags during the loading of the bags into the carton. Referring to FIGS. 1, 6 and 7, the plate 25 may also be adapted to form a portion of the pivoting door assembly which provides the opening for the gravity feeding of the bags into the carton. The plate 25 is further adapted to rotate 90° such that the plate 25 comes up behind the rear most bag and forms a vertical surface to align the bags during their descent into the box. As shown in FIGS. 1 and 7, it is also desirable to provide a rounded back 25a for the plate 25 such that if a bag in the collecting assembly 210 advances against the flap 25 while the flap is in the upright position shown in FIG. 1, the return of the flap 25 will ease the bag back when returning to a horizontal position.

The movement of the plate 25 should be adapted such that the plate rotates 90° from a horizontal position to a vertical position. Referring to FIG. 7, a positioning mechanism for the plate 25 is shown for the preferred embodiment. The positioning mechanism includes a cam shaft 223 which is connected to a cam 250 having a profile adapted to move the composite linkage a suitable distance to provide 90° displacement of the plate 25. The particular profile of the cam 250 will depend upon the lengths of the various connecting mechanisms, and it is believed that its design is within the knowledge of those of skill in the art.

In the preferred embodiment, the cam shaft 223 is connected to a motor, clutch-brake, and worm reductor similar to the motor 120, clutch-brake 121 and worm reductor 122. Indeed, since the actuation of the plate 25 may be simultaneous with the actuation of the plunger 30, in the preferred embodiment, the cam shaft 223 is interconnected with the motor 120 by a clutch-brake and a worm reductor branched off of the motor 120, and is driven by the motor 120.

Accordingly, referring again to FIG. 7, when the cam shaft 123 turns one revolution, the pivoting plate 25 is made to raise from its horizontal position by means of a cam follower 151 attached to a cam lever 152 which is fixed to an oscillating shaft 153 and which drives a lever 154. A rod end 155, a vertical connecting rod 156, and a rod end 157 are connected to the pivoting plate 25 which turns approximately 90° about pin 159.

In the preferred embodiment, an additional important feature of the design of the pivoting plate 25 is that it gently compresses the row of bags against the back stop 23 upon the pivoting of the pivoting plage 25 to a vertical position. This insures that the bags will be vertically aligned upon their movement into the carton.

Referring now to FIG. 6, the present invention may also include a drop chute 260 mounted between the doors 178 and the carton 40 such that the drop chute 260 aligns the bags into a desired position within the carton upon their passage through the doors 178.

Considering now in greater detail the operation of the pivoting trap door 178, the pivoting trap door 178 support the weight of the bags after they leave the first side belts 14 and horizontal belts 17 and enter the second side belts 20. A trunnion mounted air cylinder 171 actuates a lever 173 via rod end 172 as best shown in FIGS. 4, 5 and 6. This oscillates a shaft 174 contained in bearings 175 which are attached to a mounting frame 176. The shaft 174 is connected to the trap door 178 with spacers 177. The oscillation of the shaft 174 pivots the door 178 between the open and closed position.

Accordingly, when the apparatus of the preferred embodiment, including each of the preferred features, is utilized, bags are fed to the collecting assembly 210 by the supply mechanism 300. Each bag is sensed by the photoelectric detection member 001 which generates an electric signal which causes the collecting assembly to index the bags forwardly approximately one width. It should be appreciated that in this step, and with other steps, a suitable delay may be programmed in to account for the lag of time between when the bag is first seen by the detection mechanism 001 and when the bag actually reaches the collecting system. When the predetermined number of bags have passed the detection mechanism 001, an electric signal is generated which causes the collecting assembly 210 to advance the row of bags contained therein to the feed station 220. The leading edge of the first bag advanced to the feed station is detected by the detecting mechanism 24, which generates electric signals to actuate the pivoting of the pivoting plate 25, the pivoting doors 178 and the downward movement of the plunger 30 to load the bags into a carton 40 disposed therebelow. At the same time, the collecting assembly 210 is collecting another row of bags therein. Once the product has been deposited into the carton, the carton is indexed forward approximately one width of the bags such that the carton is ready to receive the new row of bags being collected in the collecting assembly. This cycle is repeated until the carton is filled, at which time the carton 40 is ejected by the carton indexing means and a new carton is indexed in place. It will be understood that this cycle may be continuously repeated until a desired quantity of product is packed within the cartons.

The instant invention has been disclosed in connection with a specific embodiment. However, it will be apparent to those skilled in the art that variations from the illustrated embodiment may be undertaken without departing from the spirit and scope of the invention. For example, the plurality of belts 14 may be replaced by a single wide belt which performs the same function as the plurality of belts 14. Additionally, advancing means other than the described belts may be utilized so long as the advancing means grip the bags to provide controlled advancement of the bags without damaging the product within the bags. These and other variations will be apparent to those skilled in the art and are within the spirit and scope of the invention.

As used in this specification and in the appended claims, it should be understood that the word "connect" or a derivative thereof, implies not only a direct, immediate connection between two recited parts, but also embraces the various arrangements wherein the parts are operatively connected, although other elements may be physically located between the connected parts. Further, the word "a" does not preclude the presence of a plurality of elements accomplishing the same function. For example, a sprocket should be understood to include either a single sprocket, or a pair of sprockets carrying out the same function.

What is claimed is:

1. An apparatus for automatically collecting and packing a selected number of units of vertically oriented frangible product into a carton, the product being supplied to the apparatus in a vertical orientation in units, one at a time, comprising:
   (a) a frame;
   (b) a collecting assembly mounted to the frame, including collecting support means for indexing forward, counting and collecting a row of such units of product in a vertical orientation until a selected number of units of such product is collected, the collecting support means including:
      (i) a pair of opposing side belts comprised of high surface friction material, the opposing side belts being disposed to receive and frictionally support a row of such units of frangible product between them;
      (ii) means for driving the opposing side belts in synchronized movement;
      (iii) detection means for detecting the arrival of a unit of frangible product between the opposing side belts; and
      (iv) controller means operatively associated with the drive means and the detection means for actuating the drive means to index forward the side belts as each unit of frangible product is supplied to the side belts until a selected number units of frangible product are supplied and, once a selected number of units of frangible product are gathered, for actuating the drive means to advance the selected number of units to a feed station and
   (c) a feed station operatively aligned with the collecting support means such that the feed station receives the row of collected product from the collecting support means upon advancement by the side belts, the feed station including:
      (i) a door pivotally mounted to the frame to pivot between a vertical open and a horizontal closed position;
      (ii) indexing means for positioning the row of product onto the door; and
      (iii) actuation means for selectively pivoting the door between the horizontal closed position for the positioning of the group of product thereon and the vertical open position to allow the passages of the product by gravity through the door.

2. The apparatus of claim 1, further comprising a means for selectively positioning a carton under said feed station door to receive a selected number row of product.

3. The apparatus of claim 1 further comprising a plunger operatively associated with the frame such that the plunger is positioned over the door and a means operatively associated with the door pivoting actuation means for moving the plunger downwardly toward the door upon the pivoting of the door to the open position.

4. The apparatus of claim 1 further comprising a means for supplying units of product in a vertical orientation to the collecting assembly.

5. An apparatus for automatically collecting a selected number of units of vertically oriented frangible product for packing in a carton, the product being supplied to the apparatus in a vertical orientation in units, one at a time, comprising:

a collecting assembly including a collecting support means for indexing forward, counting and collecting a row of such units of product in a vertical orientation until a selected number of units of such product is collected, the collecting support means including:

(a) a pair of opposing side belts comprised of high surface friction material, the opposing side belts being disposed to receive and frictionally support a row of such units of frangible product between them;

(b) means for driving the opposing side belts in synchronized movement;

(c) detection means for detecting the arrival of a unit of frangible product between the opposing side belts; and (d) controller means operatively associated with the drive means and the detection means for actuating the drive means to index forward the side belts as each unit of frangible product is supplied to the side belts until a selected number units of frangible product are supplied and, once a selected number of units of frangible product are gathered, for actuating the drive means to advance the selected number of units to a feed station.

* * * * *

UNITED STATES PATENT AND TRADEMARK OFFICE
CERTIFICATE OF CORRECTION

PATENT NO.  : 4,583,351

DATED       : April 22, 1986

INVENTOR(S) : David M. Fallas

It is certified that error appears in the above-identified patent and that said Letters Patent is hereby corrected as shown below:

In Column 2, line 29, after the word "thereby", please insert the word -- be --.

In Column 5, line 32, please delete the word "faciliate" and insert the word -- facilitate --.

In Column 6, line 25, please delete the word "stil" and insert the word -- still --.

In Column 6, line 44, please delete the word "mechahisms" and insert the word -- mechanisms --.

In Column 6, line 56, after the words "and sprocket", please delete "103" and insert -- 101 --.

In Column 8, line 68, please delete the word "plage" and insert the word -- plate --.

In Column 10, lines 56-57, please delete the word "passages" and insert the word -- passage --.

Signed and Sealed this

Twelfth Day of August 1986

[SEAL]

Attest:

DONALD J. QUIGG

Attesting Officer

Commissioner of Patents and Trademarks